(12) United States Patent
Ellis et al.

(10) Patent No.: US 9,065,660 B2
(45) Date of Patent: Jun. 23, 2015

(54) USAGE MONITORING AFTER ROLLOVER

(75) Inventors: Stephen E. Ellis, Ottawa (CA); Fan Mo, Ottawa (CA)

(73) Assignee: Alcatel Lucent, Boulogne-Billancourt (FR)

( * ) Notice: Subject to any disclaimer, the term of this patent is extended or adjusted under 35 U.S.C. 154(b) by 544 days.

(21) Appl. No.: 13/094,439

(22) Filed: Apr. 26, 2011

(65) Prior Publication Data

US 2012/0278472 A1    Nov. 1, 2012

(51) Int. Cl.
| | | |
|---|---|---|
| G06F 15/173 | (2006.01) | |
| H04L 12/14 | (2006.01) | |
| H04L 29/08 | (2006.01) | |
| H04M 15/00 | (2006.01) | |
| H04W 4/24 | (2009.01) | |

(52) U.S. Cl.
CPC ........ *H04L 12/1407* (2013.01); *H04L 12/1435* (2013.01); *H04L 67/14* (2013.01); *H04M 15/66* (2013.01); *H04W 4/24* (2013.01); *H04M 15/844* (2013.01); *H04M 15/852* (2013.01); *H04M 15/881* (2013.01)

(58) Field of Classification Search
CPC . H04L 12/1407; H04L 12/1435; H04W 4/24; H04M 15/66; G06F 15/173
USPC .................................................. 709/223–226
See application file for complete search history.

(56) References Cited

U.S. PATENT DOCUMENTS

| | | | | |
|---|---|---|---|---|
| 6,532,282 B1 * | 3/2003 | Plush et al. | ............... | 379/114.03 |
| 7,433,455 B1 * | 10/2008 | Oran | ......................... | 379/201.01 |
| 7,647,374 B2 * | 1/2010 | Rajahalme et al. | ........... | 709/204 |
| 7,813,299 B2 * | 10/2010 | Yumoto et al. | ................ | 370/254 |
| 8,601,137 B2 * | 12/2013 | Kong et al. | ................... | 709/228 |
| 2004/0002324 A1 * | 1/2004 | Juntunen et al. | .............. | 455/406 |
| 2004/0224661 A1 * | 11/2004 | Pericas et al. | ................. | 455/406 |
| 2005/0049973 A1 * | 3/2005 | Read et al. | ....................... | 705/59 |
| 2006/0041657 A1 * | 2/2006 | Wen et al. | ...................... | 709/224 |
| 2006/0062393 A1 * | 3/2006 | Hsu et al. | ....................... | 380/281 |
| 2006/0123122 A1 * | 6/2006 | Jung et al. | ...................... | 709/227 |
| 2006/0185005 A1 * | 8/2006 | Graves et al. | ..................... | 726/9 |
| 2008/0040267 A1 * | 2/2008 | Krishnamoorthy et al. | .... | 705/40 |
| 2008/0049629 A1 * | 2/2008 | Morrill | ......................... | 370/250 |
| 2008/0194276 A1 * | 8/2008 | Lin et al. | ......................... | 455/466 |
| 2009/0164622 A1 * | 6/2009 | Braam et al. | .................. | 709/224 |
| 2009/0265456 A1 * | 10/2009 | Bouvier et al. | ............... | 709/224 |
| 2010/0020969 A1 * | 1/2010 | Huin et al. | ..................... | 380/239 |
| 2010/0076615 A1 * | 3/2010 | Daniel et al. | .................. | 700/293 |
| 2010/0099378 A1 * | 4/2010 | Amato et al. | .................. | 455/408 |
| 2010/0162335 A1 * | 6/2010 | Davis | ............................ | 725/110 |
| 2011/0087765 A1 * | 4/2011 | Musgrave et al. | ............ | 709/224 |

* cited by examiner

*Primary Examiner* — Razu Miah
(74) *Attorney, Agent, or Firm* — Kramer & Amado, P.C.

(57) ABSTRACT

Various exemplary embodiments relate to a method and related network node including one or more of the following: determining a session to roll over; determining whether usage monitoring at a usage monitoring node is currently disabled for the session; and if usage monitoring at the usage monitoring node is currently disabled for the session, sending a message from the session management node to the usage monitoring node, wherein the message includes an instruction to enable usage monitoring for the session. Various alternative embodiments additionally include one or more of the following: waiting for a length of time to receive a usage report at the session management node from the usage monitoring node; wherein the step of sending a message from the session management node to the usage monitoring node is only performed when a usage report is not received during the length of time.

16 Claims, 6 Drawing Sheets

| | 305 | 310 | 315 | 320 | 325 |
|---|---|---|---|---|---|
| | Subscription ID | Monitoring Key | Usage Limit | Used Transfer | ... |
| 330 | 0x92D2 | 0x5A | 50G | 0G | ... |
| 335 | 0xC320 | 0x83 | 40G | 20G | ... |
| 340 | ... | ... | ... | ... | ... |

USAGE MONITORING AFTER ROLLOVER

TECHNICAL FIELD

Various exemplary embodiments disclosed herein relate generally to subscription networks.

BACKGROUND

As the demand increases for varying types of applications within mobile telecommunications networks, service providers must constantly upgrade their systems in order to reliably provide this expanded functionality. What was once a system designed simply for voice communication has grown into an all-purpose network access point, providing access to a myriad of applications including text messaging, multimedia streaming, and general Internet access. In order to support such applications, providers have built new networks on top of their existing voice networks. As seen in second and third generation networks, voice services must be carried over dedicated voice channels and directed toward a circuit-switched core, while other service communications are transmitted according to the Internet Protocol (IP) and directed toward a different, packet-switched core. This led to unique problems regarding application provision, metering and charging, and quality of experience (QoE) assurance.

In an effort to simplify the dual core approach of the second and third generations, the 3rd Generation Partnership Project (3GPP) has recommended a new network scheme it terms "Long Term Evolution" (LTE). In an LTE network, all communications are carried over an IP channel from user equipment (UE) to an all-IP core called the Evolved Packet Core (EPC). The EPC then provides gateway access to other networks while ensuring an acceptable QoE and charging a subscriber for their particular network activity.

The 3GPP generally describes the components of the EPC and their interactions with each other in a number of technical specifications. Specifically, 3GPP TS 29.212, 3GPP TS 29.213, TS 23.203, and 3GPP TS 29.214 describe the Policy and Charging Rules Function (PCRF), Policy and Charging Enforcement Function (PCEF), and Bearer Binding and Event Reporting Function (BBERF) of the EPC. These specifications also mention a Subscriber Profile Repository (SPR) that interacts with the PCEF through an Sp interface. These specifications further provide some guidance as to how these elements interact in order to provide reliable data services and charge subscribers for use thereof.

SUMMARY

Various exemplary embodiments relate to a method of performing a rollover by a session management node, the method including one or more of the following: determining a session to roll over; determining whether usage monitoring at a usage monitoring node is currently disabled for the session; and if usage monitoring at the usage monitoring node is currently disabled for the session, sending a message from the session management node to the usage monitoring node, wherein the message includes an instruction to enable usage monitoring for the session.

Various exemplary embodiments relate to a session management node for performing a rollover, the session management node including one or more of the following: an interface that communicates with a usage monitoring node; a session storage that stores a plurality of session records; a rollover initiator than determines that a rollover should be performed, in response to determining that a rollover should be performed, retrieves a session record, and determines whether usage monitoring at the usage monitoring node is currently disabled for a session associated with the session record; and a message generator that, if usage monitoring at the usage monitoring node is currently disabled for a session associated with the session record, generates a message instructing the usage monitoring node to enable usage monitoring at the usage monitoring node for a session associated with the session record.

Various exemplary embodiments relate to a machine-readable storage medium encoded with instructions for performing a rollover by a session management node, the machine readable storage medium including one or more of the following: instructions for determining a session to roll over; instructions for determining whether usage monitoring at a usage monitoring node is currently disabled for the session; and instructions for if usage monitoring at the usage monitoring node is currently disabled for the session, sending a message from the session management node to the usage monitoring node, wherein the message includes an instruction to enable usage monitoring for the session.

Various alternative embodiments additionally include one or more of the following: waiting for a length of time to receive a usage report at the session management node from the usage monitoring node; wherein the step of sending a message from the session management node to the usage monitoring node is only performed when a usage report is not received during the length of time.

Various alternative embodiments additionally include one or more of the following: determining at least one attribute to modify for the session; and determining a new value for the at least one attribute; wherein the message further includes an instruction to apply the new value to the at least one attribute for the session. Various alternative embodiments are described wherein the at least one attribute includes a quality of service (QoS) characteristic.

Various alternative embodiments are described wherein the session management node is a Policy and Charging Rules Node (PCRN) and the usage monitoring node is a Packet Data Network Gateway (PGW).

Various alternative embodiments are described wherein the step of determining a session to roll over includes one or more of the following: determining that a billing period has begun; and in response to determining that a new billing period has begun, retrieving at least one session managed by the session management node.

Various alternative embodiments additionally include one or more of the following: determining an applicable policy set for the session; and determining a usage value to which a policy of the policy set will apply for the session; wherein the message further includes an instruction to send a usage report when the session has reached the usage value.

Various alternative embodiments are described wherein the step of determining whether usage monitoring at a usage monitoring node is currently disabled for the session includes one or more of the following: determining an applicable policy set for the session, wherein the applicable policy set includes a plurality of thresholds; and determining whether all thresholds were met by the session prior to the current rollover.

Various alternative embodiments additionally include, if usage monitoring at the usage monitoring node is not currently disabled for the session, sending a message from the session management node to the usage monitoring node, wherein the message includes an instruction to disable usage monitoring for the session.

Various exemplary embodiments relate to a method of performing a rollover by a session management node, the method including one or more of the following: determining a session to roll over; sending a first request message from the session management node to the usage monitoring node, wherein the message includes an instruction to disable usage monitoring for the session; waiting for a period of time to receive a second request message from the usage monitoring node; if the session management node receives the second request message from the usage monitoring node, sending an answer message to the usage monitoring node, wherein the answer message includes an instruction to enable usage monitoring for the session; and the session management node does not receive the second request message from the usage monitoring node, sending a third request message to the usage monitoring node, wherein the third request message includes an instruction to enable usage monitoring for the session.

BRIEF DESCRIPTION OF THE DRAWINGS

In order to better understand various exemplary embodiments, reference is made to the accompanying drawings, wherein.

DETAILED DESCRIPTION

The Third Generation Partnership Project (3GPP) provides some guidance with regard to the interactions between a policy and charging rules node (PCRN) and a packet data network gateway (PGW) to effect usage monitoring for sessions and/or flows in a Long Term Evolution (LTE) environment. For example, the PCRN may indicate that a PGW should monitor usage associated with a specified session or flow by transmitting a message including the Usage-Monitoring-Information attribute-value pair (AVP). In the Usage-Monitoring-Information AVP, the PCRN may indicate a particular usage amount at which the PGW should transmit a usage report message indicating that the particular session or flow has crossed the specified threshold. If the PCRN does not request further usage monitoring, the PGW should discontinue monitoring the session or flow until the PCRN does transmit an additional Usage-Monitoring-Information AVP indicating the next threshold which should be reported.

Problems exist, however, in the 3GPP's instruction as to how the PCRN and PGW should handle usage monitoring after a monthly (or other) rollover. For example, after a monthly (or other) rollover, usage statistics may be reset for a particular session. Because the usage statistics have been reset, the PGW should begin monitoring the session for the lowest threshold. This may accomplished by the PCRN first transmitting an instruction to disable any current monitoring. The PGW is then expected to inform the PRCN about any usage since the last enabled threshold. Subsequently, the PCRN may transmit an instruction to enable usage monitoring for the session with the lowest applicable threshold, because all usage values have been reset.

Under some circumstances, however, the final applicable threshold may have been reached prior to the monthly (or billing period) rollover. In this case, the PGW may have already disabled monitoring for the particular session, as suggested by the 3GPP for the case where the PCRN does not transmit a new threshold in response to a usage report. Upon rollover, the PCRN may transmit an instruction to disable usage monitoring for the session, even though usage monitoring was already disabled. It is unclear in the 3GPP how the PGW is supposed to respond to such a scenario. Different vendors of PGW equipment may handle the situation differently, thus leading to unpredictable results. Accordingly, there exists a need for a method of avoiding transmitting "confusing" instructions, such as instructions to disable usage monitoring for a session when usage monitoring is already disabled.

It should be noted that, while various examples relate to implementations of LTE, as defined by the 3GPP, the devices and methods presented herein may be applicable to other access systems or networks such as, for example, a network access system (NAS). Appropriate modifications will be apparent to those of ordinary skill in the art for implementing these devices and methods in conjunction with alternative access systems and/or networks. It should also be appreciated that while various examples are described with reference to session usage monitoring, the methods described herein may also be applied to flow-level monitoring. Accordingly, as used herein, the term "session" will be understood to encompass both sessions and flows. Further, the term "rollover" as used herein will be understood to refer to any periodic reset of one or more session parameters. For example, various embodiments herein describe a "monthly rollover" wherein, at the beginning of each month, a subscriber's usage statistics are reset to zero and quality of service is reset to its original and unmodified value.

Referring now to the drawings, in which like numerals refer to like components or steps, there are disclosed broad aspects of various exemplary embodiments.

Figure 1:
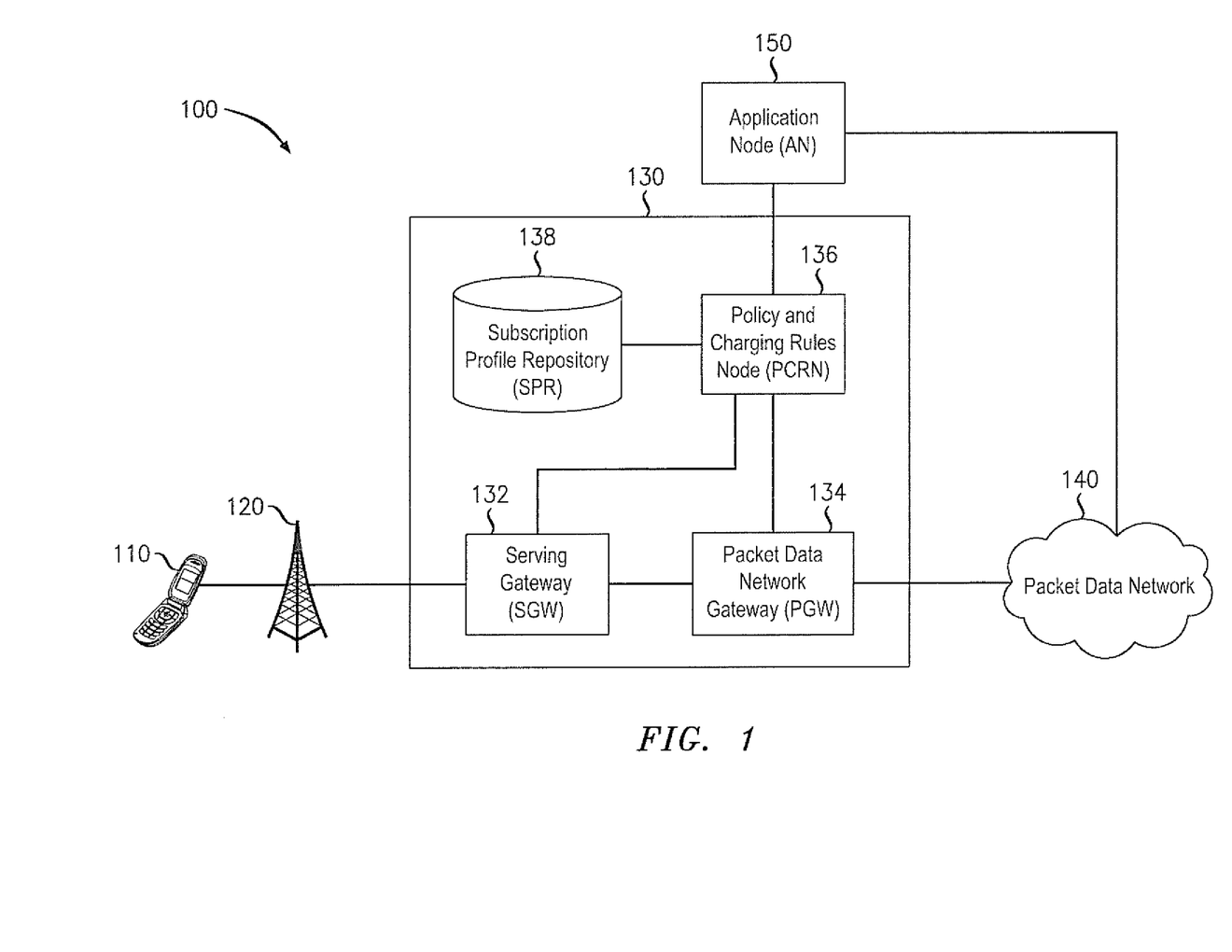
FIG. 1 illustrates an exemplary subscriber network for providing various data services.

FIG. 1 illustrates an exemplary subscriber network 100 for providing various data services. Exemplary subscriber network 100 may be a telecommunications network or other network for providing access to various services. Exemplary subscriber network 100 may include user equipment (UE) 110, base station 120, evolved packet core (EPC) 130, packet data network 140, and application node (AN) 150.

User equipment 110 may be a device that communicates with packet data network 140 for providing the end-user with a data service. Such data service may include, for example, voice communication, text messaging, multimedia streaming, and Internet access. More specifically, in various exemplary embodiments, user equipment 110 is a personal or laptop computer, wireless email device, cell phone, television set-top box, or any other device capable of communicating with other devices via EPC 130.

Base station 120 may be a device that enables communication between user equipment 110 and EPC 130. For example, base station 120 may be a base transceiver station such as an evolved nodeB (eNodeB) as defined by 3GPP standards. Thus, base station 120 may be a device that communicates with user equipment 110 via a first medium, such as radio communication, and communicates with EPC 130 via a second medium, such as Ethernet cable. Base station 120 may be in direct communication with EPC 130 or may communicate via a number of intermediate nodes (not shown). In various embodiments, multiple base stations (not shown) may be present to provide mobility to user equipment 110. Note that in various alternative embodiments, user equipment 110 may communicate directly with evolved packet core. In such embodiments, base station 120 may not be present.

Evolved packet core (EPC) 130 may be a device or network of devices that provides user equipment 110 with gateway access to packet data network 140. EPC 130 may further charge a subscriber for use of provided data services and ensure that particular quality of experience (QoE) standards are met. Thus, EPC 130 may be implemented, at least in part, according to the 3GPP TS 29.212, 29.213, and 29.214 standards. Accordingly, EPC 130 may include a serving gateway (SGW) 132, a packet data network gateway (PGW) 134, a policy and charging rules node (PCRN) 136, and a subscription profile repository (SPR) 138.

Serving gateway (SGW) 132 may be a device that provides gateway access to the EPC 130. SGW 132 may be the first device within the EPC 130 that receives packets sent by user equipment 110 and may forward such packets toward PGW 134. SGW 132 may perform a number of additional functions such as, for example, managing mobility of user equipment 110 between multiple base stations (not shown) and enforcing particular quality of service (QoS) characteristics, such as guaranteed bit rate, for each flow being served. In various implementations, such as those implementing the Proxy Mobile IP (PMIP) standard, SGW 132 may include a Bearer Binding and Event Reporting Function (BBERF). In various exemplary embodiments, EPC 130 may include multiple SGWs (not shown) and each SGW may communicate with multiple base stations (not shown).

Packet data network gateway (PGW) 134 may be a device that provides gateway access to packet data network 140. PGW 134 may be the final device within the EPC 130 that receives packets sent by user equipment 110 toward packet data network 140 via SGW 132. PGW 134 may include a policy and charging enforcement function (PCEF) that enforces policy and charging control (PCC) rules for each service data flow (SDF). Thus, PGW 134 may be a policy and charging enforcement node (PCEN). PGW 134 may include a number of additional features such as, for example, packet filtering, deep packet inspection, and subscriber charging support.

PGW 134 may also monitor the usage of a number of sessions and/or flows at the instruction of PCRN 136. Thus, PGW 134 may be a member of a class of devices referred to as "usage monitoring nodes." For each session or flow for which usage monitoring is enabled, PGW 134 may monitor the data transferred until a threshold specified by the PCRN 136 is met. Upon meeting such threshold, the PGW 134 may transmit a usage report to the PCRN 136 indicating that the session or flow has met the specified threshold. Thereafter, PGW 134 may continue to perform usage monitoring for the session or flow until PGW 134 receives additional instruction from the PCRN 136 informing the PGW that usage monitoring is no longer required.

Policy and charging rules node (PCRN) 136 may be a device that receives requests for services, generates PCC rules, and provides PCC rules to the PGW 134 and/or other PCENs (not shown). PCRN 136 may also establish other types of sessions at the request of UE 110 such as, for example, IP Connectivity Access Network (IP-CAN) sessions and/or gateway control sessions. PCRN 136 may receive requests from AN 150 via an RX interface, from SGW 132 via a Gxx interface, and/or from PGW 134 via a Gx interface. Upon receipt of a service request, PCRN 136 may generate or modify at least one PCC rule for fulfilling the service request. PCRN 136 may communicate with SPR 138 via the Sp interface, or other data query mechanisms such as Lightweight Directory Access Protocol (LDAP), when creating PCC rules. PCRN 136 may, for example, use SPR 138 to obtain subscriber service data and/or to coordinate messages from multiple sources. In view of the session management function performed by PCRN 136, PCRN 136 may be a member of a class of devices referred to as "session management nodes."

Up on creation or modification of a PCC rule or upon request by the PGW 134, PCRN 136 may provide a PCC rule to PGW 134 via the Gx interface. In various embodiments, such as those implementing the PMIP standard for example, PCRN 136 may also generate QoS rules. Upon creation or modification of a QoS rule or upon request by the SGW 132, PCRN 136 may provide a QoS rule to SGW 132 via the Gxx interface.

PCRN 136 may also instruct PGW 134 to monitor the usage for particular sessions and/or flows. Thus, PCRN 136 may calculate the next usage threshold for each session (or flow) to be monitored and instruct the PGW 134 to monitor usage and report to the PCRN 136 once a threshold is met. Upon receiving a usage report indicating that a particular usage threshold has been met, PCRN 136 may take one or more policy actions such as, for example, sending a warning message, reducing quality of service, or terminating service. If additional thresholds have not yet been met, PCRN 136 may also send another instruction to continue monitoring usage at the PGW 134 by indicating the next applicable threshold.

Subscription profile repository (SPR) 138 may be a device that stores information related to subscribers to the subscriber network 100. Thus, SPR 138 may include a machine-readable storage medium such as read-only memory (ROM), random-access memory (RAM), magnetic disk storage media, optical storage media, flash-memory devices, and/or similar storage media. SPR 138 may be a component of PCRN 136, may constitute an independent node within EPC 130, or may be a combination of both. SPR 138 may also be distributed across a network, with some components within EPC 130 and other components connected via a network.

SPR 138 may store a subscription record for a number of subscribers. Each subscription record may include a number of subscription identifiers such as, for example, an IPv4 address, an IPv6 address, an international mobile subscriber identity (IMSI), a network access identifier (NAI), a circuit identifier, a point-to-point protocol (PPP) identifier, and a mobile subscriber ISDN (MSISDN) number. Each subscription record may additionally include subscription parameters such as, for example, bandwidth limits, charging parameters, subscriber priority, and subscriber service preferences.

Note that in various alternative embodiments, subscriber network 100 may include a User Data Repository (UDR) (not shown) in lieu of SPR 138. Such a UDR may include similar data to that contained in the SPR 138. Various modifications to the techniques described herein will be apparent in order to provide interoperation between PCRN 136 and a UDR.

Packet data network 140 may be any network for providing data communications between user equipment 110 and other devices connected to packet data network 140, such as AN 150. Packet data network 140 may further provide, for example, phone and/or Internet service to various user devices in communication with packet data network 140.

Application node (AN) 150 may be a device that includes an application function (AF) and provides an application service to user equipment 110. Thus, AN 150 may be a server or other device that provides, for example, a video streaming or voice communication service to user equipment 110. When AN 150 is to begin providing application service to user equipment 110, AN 150 may generate a request message, such as an authorization and authentication request (AAR) according to the Diameter protocol, to notify the PCRN 136. This request message may include information such as an identification of the subscriber using the application service and an identification of the particular service data flows that must be established in order to provide the requested service. AN 150 may communicate such an application request to the PCRN 136 via the Rx interface.

Various services may be requested, and subsequently established, based on an AAR sent to PCRN 136 by AN 150, based on a CCR sent to the PCRN 136 by PGW 134 or SGW 132, or based on a combination thereof. For example, PCRN 136 may receive an AAR and a CCR both requesting a particular service for a particular user. Accordingly, the PCRN 136 is adapted to determine that two request messages are associated with the same session and process the messages accordingly. For example, the PCRN 136 or a Diameter Proxy Agent (not shown) may use a session binding identifier (SBI) to determine that a request message is related to a previously received request message. Thus, PCRN 136 may establish a session based on an initial request message and subsequently modify the session based on the supplemental request message.

Having described the components of subscriber network 100, a brief summary of the operation of subscriber network 100 will be provided. It should be apparent that the following description is intended to provide an overview of the operation of subscriber network 100 and is therefore a simplification in some respects. The detailed operation of subscriber network 100 will be described in further detail below in connection with FIGS. 2-9. Note that while various examples provided herein refer to monitoring the usage of a session, the methods described herein are also applicable to monitoring usage with regard to particular flows.

PCRN 136 may include a number of policies that may be applied to sessions and/or flows at various usage thresholds. Upon establishing a new session, PCRN 136 may determine the first usage threshold applicable to the new session. As an example, a first applicable policy may provide that, at 80% of the subscriber's quota, a warning message should be sent to the user equipment 110. Accordingly, PCRN 136 may construct a message indicating that once the session reaches 80% of the usage quota, PGW 134 should send a usage report to PCRN 136.

After receiving this usage report, PGW 134 may commence monitoring usage for the session. Once the session has transferred 80% of the quota, PGW 134 may transmit a usage report to PCRN 136, indicating that the threshold has been met. In response, PCRN 136 may transmit a warning message to UE 110 in accordance with the first policy, determine the next applicable threshold, and transmit an instruction to the PGW 134 to continue monitoring usage for the session.

Interoperation of the PGW 134 and PCRN 136 may continue in this manner until the PCRN 136 receives a usage report associated with the last applicable threshold. Accordingly, no additional thresholds may be defined and, as such, PCRN 136 may not transmit any new threshold to PGW 134. As specified by the 3GPP, PGW 134 may, in response, discontinue usage monitoring for the session.

Later, upon the beginning of a new month or other billing period, PCRN 136 may initiate a monthly rollover for a number of sessions. As part of such rollover, the usage statistics for each of the sessions may be reset to zero. For those sessions that had not reached the final threshold, the PCRN 136 may send messages to the PGW 134 disabling the current usage monitoring and subsequently enabling monitoring for the first applicable threshold. For the sessions that had met all applicable thresholds in the previous month, however, usage monitoring may already be disabled at the PGW 134. Accordingly, PCRN 136 may instead send a message enabling monitoring for the first applicable threshold. As such, the PCRN 136 avoids attempting to disable usage monitoring when the PGW 134 has already disabled usage monitoring for the session. Thus, the unpredictability of how PGW 134 may respond to such an instruction is avoided.

Figure 2:
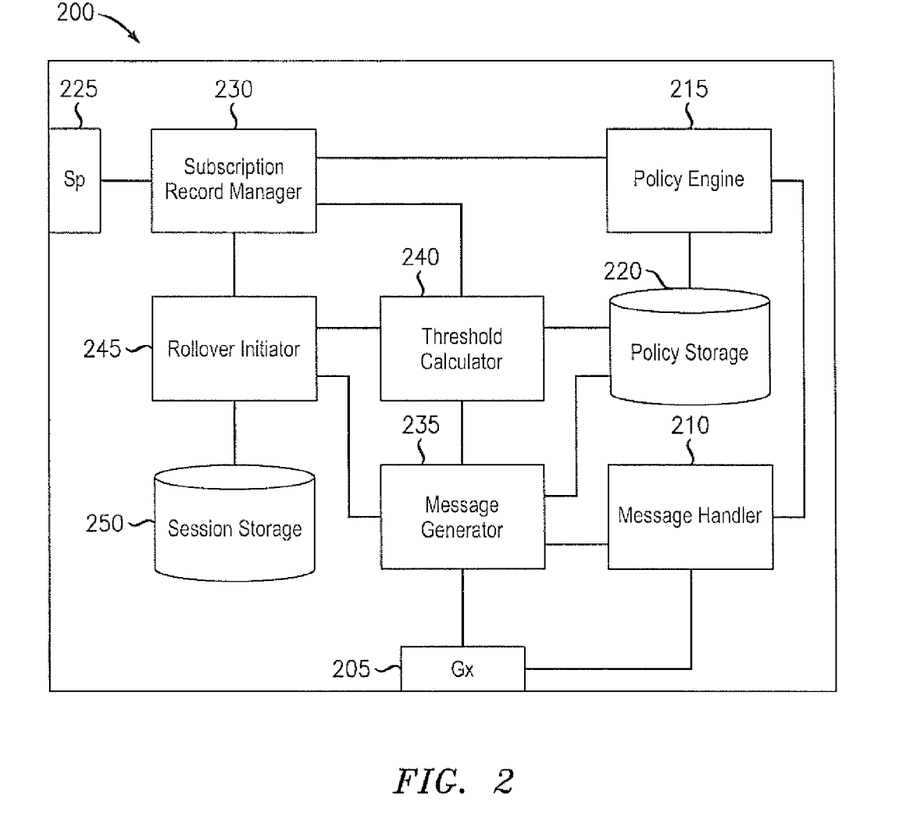
FIG. 2 illustrates an exemplary session management node for applying usage policies and handling rollovers.

FIG. 2 illustrates an exemplary session management node 200 for applying usage policies and handling rollovers. In various embodiments implementing the LTE standard, session management node 200 may be a PCRN such as PCRN 136. Exemplary session management node 200 may include a Gx interface 205, message handler 210, policy engine 215, policy storage 220, Sp interface 225, subscription record manager 230, message generator 235, threshold calculator 240, rollover initiator 245, and session storage 250. It will be apparent that various components may be specific to implementations of particular standards and that various modifications may be appropriate for implementation of alternative standards.

Gx interface 205 may be an interface comprising hardware and/or executable instructions encoded on a machine-readable storage medium configured to communicate with other network nodes such as, for example, PGW 134 using the Diameter protocol. Accordingly, Gx interface 205 may be adapted to transmit RAR and CCA messages and to receive RAA and CCR messages.

Message handler 210 may include hardware and/or executable instructions on a machine-readable storage medium configured to receive and process various messages via Gx interface 205. Message handler 210 may receive usage reports from usage monitoring nodes such as PGW 134. Such usage reports may indicate that a particular session (or flow) has reached a particular threshold. Accordingly, message handler 210 may forward such information to policy engine 215 for application of an appropriate policy. Message handler 210 may further forward the information to message generator 235 for responding to the message. Message handler 210 may handle various additional types of messages such as, for example, requests for IP-CAN session establishment and/or policy and charging control (PCC) rules.

Policy engine 215 may include hardware and/or executable instructions on a machine-readable storage medium configured to apply various policies to sessions, as defined in policy storage 220. Upon receiving usage report information regarding a particular session, policy engine may request the subscription record for the associated subscriber from subscription record manager 230. This retrieved subscription record may indicate a usage limit and previously recorded usage amount for the subscriber. Policy engine 215 may then update the subscription record to include the usage amount most recently reported by a usage monitoring node. Using the usage limit and the now-current usage amount, the policy engine may determine and apply an appropriate policy. Policy engine 215 may also return the modified subscription record to the subscription record manager 230 for caching and/or storage on an SPR.

Policy storage 220 may be any machine-readable medium capable of storing data related to usage policies. Accordingly, policy storage 220 may include a machine-readable storage medium such as read-only memory (ROM), random-access memory (RAM), magnetic disk storage media, optical storage media, flash-memory devices, and/or similar storage media.

Sp interface 225 may be an interface comprising hardware and/or executable instructions encoded on a machine-readable storage medium configured to communicate with other network nodes such as, for example, SPR 138 using the Diameter protocol. Accordingly, Sp interface 225 may be adapted to transmit requests for subscription records and to receive subscription records. In various alternative embodiments, session management node 200 may include a local SPR. In such embodiments, Sp interface 225 may not be present. In other alternative embodiments, SPR 138 may instead be accessible via LDAP. In such embodiments, Sp interface 225 may be replaced by an LDAP interface (not shown).

Subscription record manager 230 may include hardware and/or executable instructions on a machine-readable storage medium configured to retrieve and store subscription records via the Sp interface. Subscription record manager 230 may receive one or more subscription identifiers from policy engine 215 and/or rollover initiator 245 and retrieve an associated subscription record. Further, subscription record manager 230 may receive one or more subscription records from policy engine 215 and/or rollover initiator 245 and transmit the records to an SPR for storage and future retrieval. Subscription record manager 230 may further include a subscription record cache (not shown). Thus, copies of subscription records may be stored locally at session management node 200 and written back to an SPR periodically.

Message generator 235 may include hardware and/or executable instructions on a machine-readable storage medium configured to generate various messages for transmission to other nodes such as PGW 134. Upon receiving an indication from message handler 210 that a particular session or flow has reached a threshold or upon receiving an indication from rollover initiator 245 that a session has been rolled over, message generator may request the next applicable threshold for the session from threshold calculator 240. Message generator may then generate a message informing the appropriate usage monitoring node of the new threshold to be monitored. If threshold calculator 240 does not return a threshold or otherwise indicates that no further thresholds are applicable, message generator 235 may refrain from generating any message instructing the PGW to monitor usage for the session. Message generator may further generate additional types of messages under appropriate circumstances such as, for example, instructions to install or modify a PCC rule.

Threshold calculator 240 may include hardware and/or executable instructions on a machine-readable storage medium configured to determine the next applicable threshold for a particular session or flow. Upon request for such information from message generator 235 or rollover initiator 245, threshold calculator 240 may request the applicable subscription record from record manager 230. Using the values for the usage limit and accumulated usage, threshold calculator 240 may examine the applicable policy set stored in policy storage 220 to determine the lowest threshold that has not yet been reached. Threshold calculator 240 may then return this information to the requesting component.

Rollover initiator 245 may include hardware and/or executable instructions on a machine-readable storage medium configured to perform session rollovers when appropriate. Rollovers may be performed periodically to reset accumulated usage for sessions. For example, at the beginning of every month, each session managed by session management node 200 may be rolled back to zero network usage. If any modifications had been previously made to a session such as, for example, a QoS reduction, these modifications may be removed as well. Accordingly, rollover initiator 245 may search session storage 250 for sessions to rollover. For each such session, rollover initiator 245 may request a subscription record from subscription record manager 230 and reset any usage values contained therein to zero. Subsequently, rollover initiator may send the modified subscription record back to subscription record manager 230 for storage.

As part of a session rollover, rollover initiator 245 may indicate to message generator 235 that usage monitoring node should be instructed to disable usage monitoring for the session and to subsequently re-enable session monitoring for the lowest applicable threshold. In the situation where all thresholds had been previously reached, however, rollover initiator 245 may only indicate to message generator that the usage monitoring node should be instructed to enable usage monitoring for the lowest applicable threshold. Accordingly, rollover initiator 245 may be capable of determining for each session whether all thresholds have been previously reached. For example, prior to modifying the subscription record, rollover initiator 245 may request the next applicable threshold from threshold calculator 240. If no valid threshold is returned, rollover initiator may assume that all thresholds have previously been reached. Alternatively, a subscription record or a session record may include an indication that all thresholds have been previously met. For example, policy engine 215, threshold calculator 240, or message generator 235 may add such an indication to a subscription record or session record upon determining that the final threshold has been reached. In such an embodiment, rollover initiator 245 may remove this indication during session rollover.

Session storage 250 may be any machine-readable medium capable of storing data related to established sessions. Accordingly, session storage 250 may include a machine-readable storage medium such as read-only memory (ROM), random-access memory (RAM), magnetic disk storage media, optical storage media, flash-memory devices, and/or similar storage media. In various embodiments, session storage 250 may be stored together with policy storage 220 within memory or may be stored in a separate component.

Figure 3:
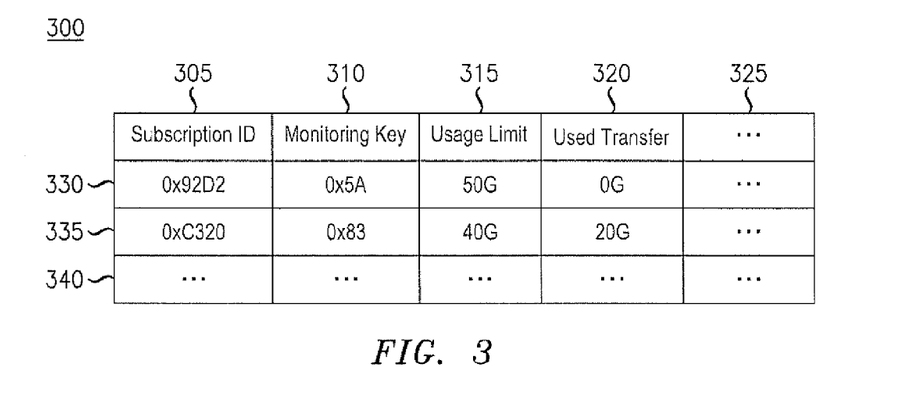
FIG. 3 illustrates an exemplary data arrangement for storing subscription records.

FIG. 3 illustrates an exemplary data arrangement 300 for storing subscription records. Data arrangement 300 may be a table in a database or cache such as SPR 138 and/or subscription record manager 230. Alternatively, data arrangement 300 may be a series of linked lists, an array, or a similar data structure. Thus, it should be apparent that data arrangement 300 is an abstraction of the underlying data; any data structure suitable for storage of this data may be used. Data arrangement may include a number of fields such as subscription ID field 305, monitoring key field 310, usage limit field 315, and used transfer field 320. Data arrangement 300 may contain numerous additional fields 325 to store data such as, for example, subscriber category, subscriber name, guaranteed bitrates, maximum bitrates, and aggregate maximum bitrate.

Subscription ID field 305 may store a unique identifier for each subscription records. In various embodiments, each subscription record may be associated with multiple subscription identifiers. In such embodiments, data arrangement 300 may include additional fields (not shown) for each such identifier.

Monitoring key field 310 may store a monitoring key for each subscription record. Such a monitoring key may be used to identify the threshold limits within a particular session or flow in the communications between a usage monitoring node and a session management node. For example, each time either the PCW 134 or PCRN 136 transmits a message including the Usage-Monitoring-Information AVP, a monitoring key may be included to identify the session or flow threshold limit to which the AVP applies.

Usage limit field 315 may indicate an amount of data transfer allowed for a subscription over a particular period of time. For example, the value in usage limit field 315 may indicate a monthly allowance of octets transferred for each subscription record.

Used transfer field 320 may indicate the amount of data actually transferred for a particular subscription within a period of time. For example, each time a session management node such as session management node 200 receives a usage monitoring report, the session management node may add the usage reported to the value currently stored in the used transfer field 320. The value of used transfer field 320 may be reset to zero periodically such as, for example, at the beginning of every month or other billing period.

As an example, subscription record 330 indicates that subscription "0x92D2" is associated with monitoring key "0x5A." Further, a usage limit of 50 G is imposed on this subscription record and 0 G of transfer have been used since the last rollover. As a further example, subscription "0xC320" is associated with monitoring key "0x83." This subscription has used 20 G, or 50%, of the allotted 40 G usage limit. Data arrangement 300 may contain numerous additional subscription records 340.

Note that in various embodiments, a subscription record may be associated with multiple monitoring keys and usage limits. For example, a particular user may have a 30 G limit on streaming video and a 20 G limit on all other communications. Appropriate modifications to data structure 300 will be apparent to those of skill in the art in order to store multiple monitoring keys, usage limits, and used transfer data.

Figure 4:
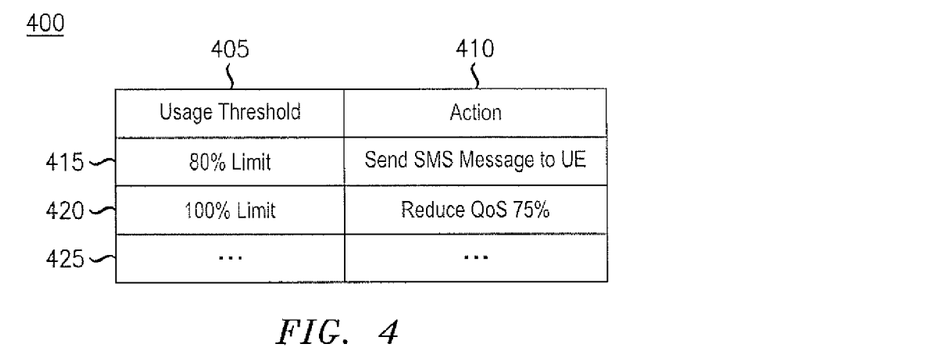
FIG. 4 illustrates an exemplary policy set for responding to subscriber usage.

FIG. 4 illustrates an exemplary policy set 400 for responding to subscriber usage. Data arrangement 400 may be a table in a database or cache such as policy storage 220. Alternatively, policy set 400 may be a series of linked lists, an array, or a similar data structure. Thus, it should be apparent that data arrangement 400 is an abstraction of the underlying data; any data structure suitable for storage of this data may be used. Data arrangement 400 may include a number of fields such as usage threshold field 405 and action field 410.

A session management node such as session management node 200 may have access to multiple policy sets such as policy set 400 that are to be used in different contexts. For example, policy set 400 may be applicable to subscriptions having a subscriber category of "silver," while a different policy set may be applicable to subscriptions having a subscriber category of "gold." As another example, policy set 400 may be applicable during weekdays between 7 AM and 7 PM while another policy set may be applicable at all other times (in this example, during nights and weekends).

Usage threshold field 405 may indicate a usage amount at which a particular policy is applicable. For example, usage threshold field 405 may indicate a percentage of a usage limit or other value at which a policy is applicable. Alternatively, usage threshold field may indicate a literal usage value such as, for example, "40 G." Action field 410 may indicate one or more actions that should be taken when a particular policy is applicable. Such action may include, for example, sending a notification to one or more nodes or altering the characteristics of a session or flow.

As an example, policy 415 indicates that once a user reaches 80% of the applicable usage limit, the session management node should send a short message service (SMS) message indicating the amount of data transferred to the UE. As a further example, policy 420 indicates that once a user reaches 100% of the applicable usage limit, QoS characteristics for that session should be reduced by 75% of their current values.

Policy set 400 may include numerous additional policies 425. Such policies 425 may specify other usage thresholds such as, for example, 70%, 90%, or 110% of the applicable usage limit. However, for the purposes of providing examples, it will be assumed herein that policies 415, 420 represent the only policies in exemplary policy set 400.

Figure 5:
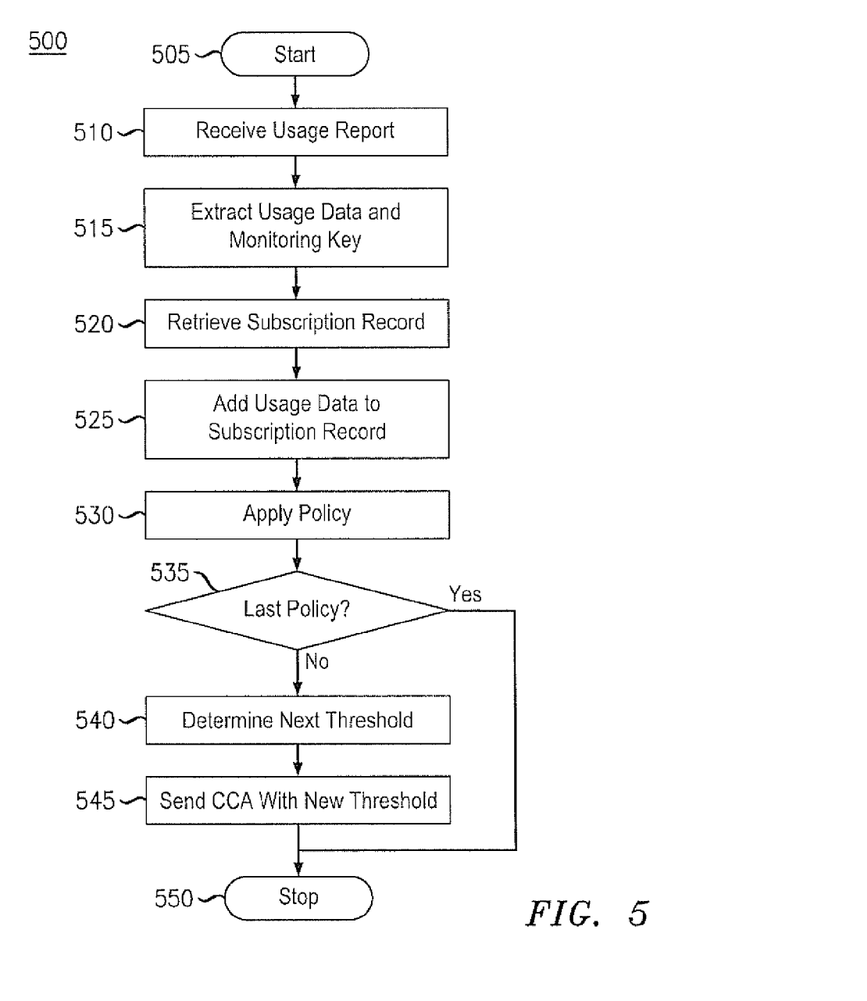
FIG. 5 illustrates an exemplary method for applying usage policies.

FIG. 5 illustrates an exemplary method 500 for applying usage policies. Method 500 may be performed, for example, by the components of session management node 200 such as message handler 210, policy engine 215, subscription record manager 230, message generator 235, and/or threshold calculator 240.

Method 500 may begin in step 505 and proceed to step 510 where session management node 200 receives a usage report for a particular session or flow, identified by a monitoring key. Session management node may extract the usage data and monitoring key from the usage report at step 515 and subsequently retrieve the associated subscription record at step 520. At step 525, session management node 525 may update the subscription record to include the usage data extracted from the usage report in addition to any previously reported usage.

Next, session management node 200 may apply a policy in view of the newly reported usage data. For example, session management node may calculate the percentage of the usage limit that has been used, determine a policy from the applicable policy set associated with the percentage, and apply the action defined by the policy. Next, session management node 200 may determine whether the applied policy was the final policy of the policy set. For example, if no higher threshold exists in the policy set, then the last policy has been applied. If the last policy has been applied, method 500 may proceed directly to step 550, where method 500 ends. Otherwise, method 500 may proceed to step 540.

In step 540, session management node 200 may determine the next applicable threshold. In other words, session management node 200 may determine the lowest policy that has not yet been applied for the session. Then, in step 545, session management node 200 may send a response message including the new threshold to the appropriate monitoring node. Finally, method 500 may end in step 550.

Figure 6:
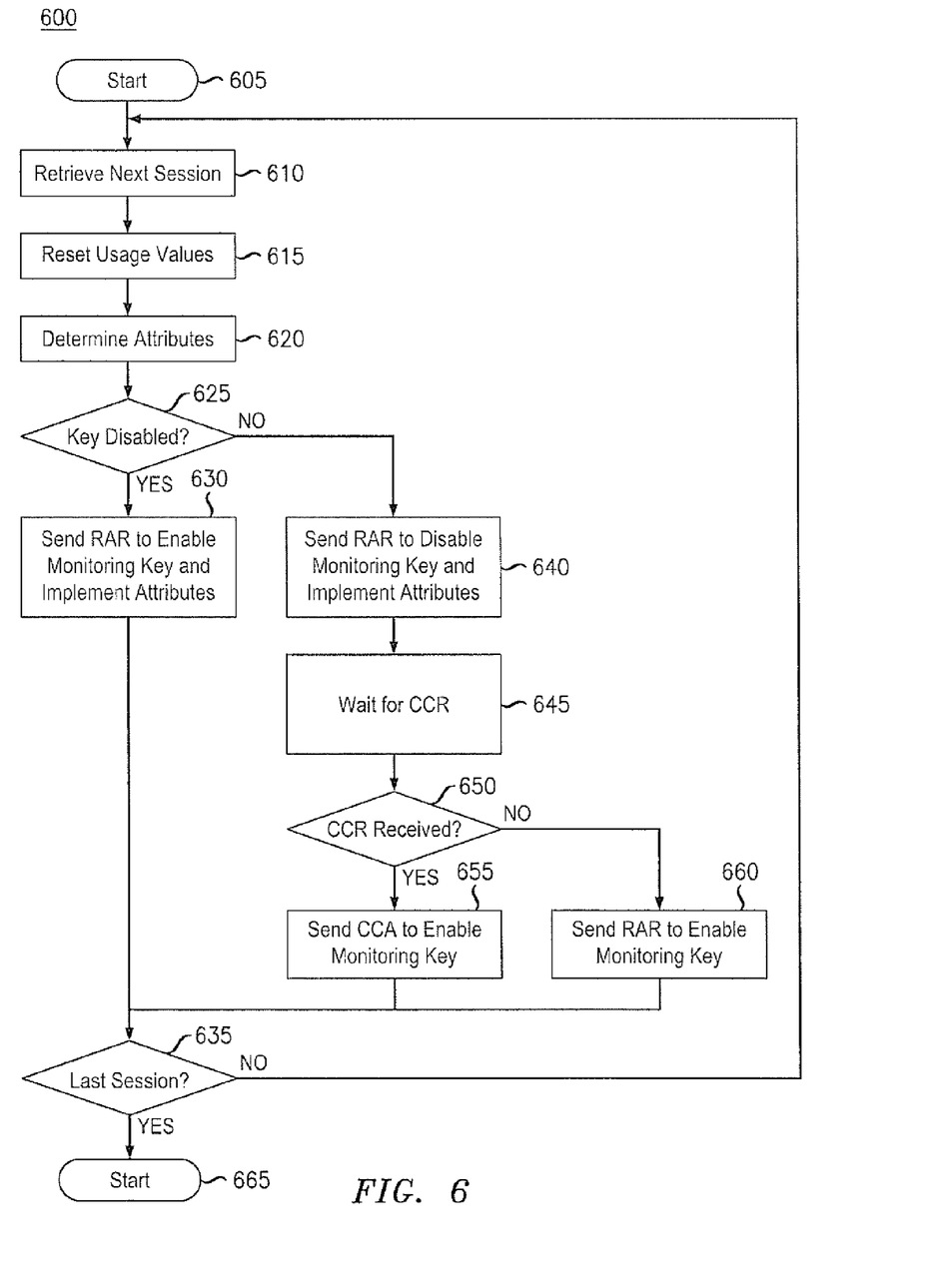
FIG. 6 illustrates an exemplary method for performing session rollover.

FIG. 6 illustrates an exemplary method 600 for performing session rollover. Method 600 may be performed, for example, by the components of session management node 200 such as subscription record manager 230, message generator 235, threshold calculator 240, and/or rollover initiator 245.

Method 600 may run whenever a session management node 200 determines that a rollover should be performed. For example, method 600 may be performed at the beginning of every month. Method 600 begins in step 605 and proceeds to step 610 where session management node 200 retrieves a managed session to roll over. For example, session management node 200 may simply select a managed session that has not yet been rolled over. Then in step 615, session management node may reset any usage values associated with the session. For example, session management node 200 may retrieve a subscription record associated with the session, reset usage values to zero, and transmit the modified subscription record to the SPR for storage.

Next, in step 620, session management node 200 may determine new values for session or flow attributes. For example, if QoS characteristics had been previously reduced due to a high amount of network usage, session management node 200 may determine restored values for the affected QoS characteristics. In step 625, session management node 200 may determine whether the monitoring key associated with the session is currently disabled at the usage monitoring node. For example, the session record or subscription record may include an indication as to whether the monitoring key is currently disabled. Alternatively, session management node 200 may have previously (prior to resetting usage values) determined whether any thresholds in the applicable policy set had not yet been reached by the session. Numerous additional methods for determining whether a monitoring key is currently enabled will be apparent to those of skill in the art.

If the monitoring key is currently disabled, method 600 may proceed to step 630 where session management node 200 may transmit a RAR to the usage monitoring node to enable the monitoring key and to implement any restored attributes determined in step 620. Method 600 may then proceed to step 635 where session management node 200 determines whether additional sessions are present that have not been rolled back. If the current session is not the last session to roll back, method 600 may loop back to step 610 where session management node 200 may repeat the process for the next session to roll back.

If, at step 625, the session management node 200 determines that the monitoring key is not disabled, method 600 may instead proceed to step 640. In step 640, session management node 200 may send a RAR to the usage monitoring node to instead disable the monitoring key and may also request the restoration of attributes determined at step 620. Session management node 200 may then wait for a period of time in step 645 to allow for the receipt of a CCR from the usage monitoring node, indicating any non-reported usage. At step 650, if such a message is received, method 650 may proceed to step 655 where session management node may transmit a CCA enabling the monitoring key at the usage monitoring node and may also request the restoration of attributes determined at step 620. If such a message is not received, on the other hand, session management node may instead transmit a RAR to the usage monitoring node to enable the key in step 660 and may also request the restoration of attributes determined at step 620. Once the last session is processed, method 600 may proceed from step 635 to end in step 665.

Figure 7:
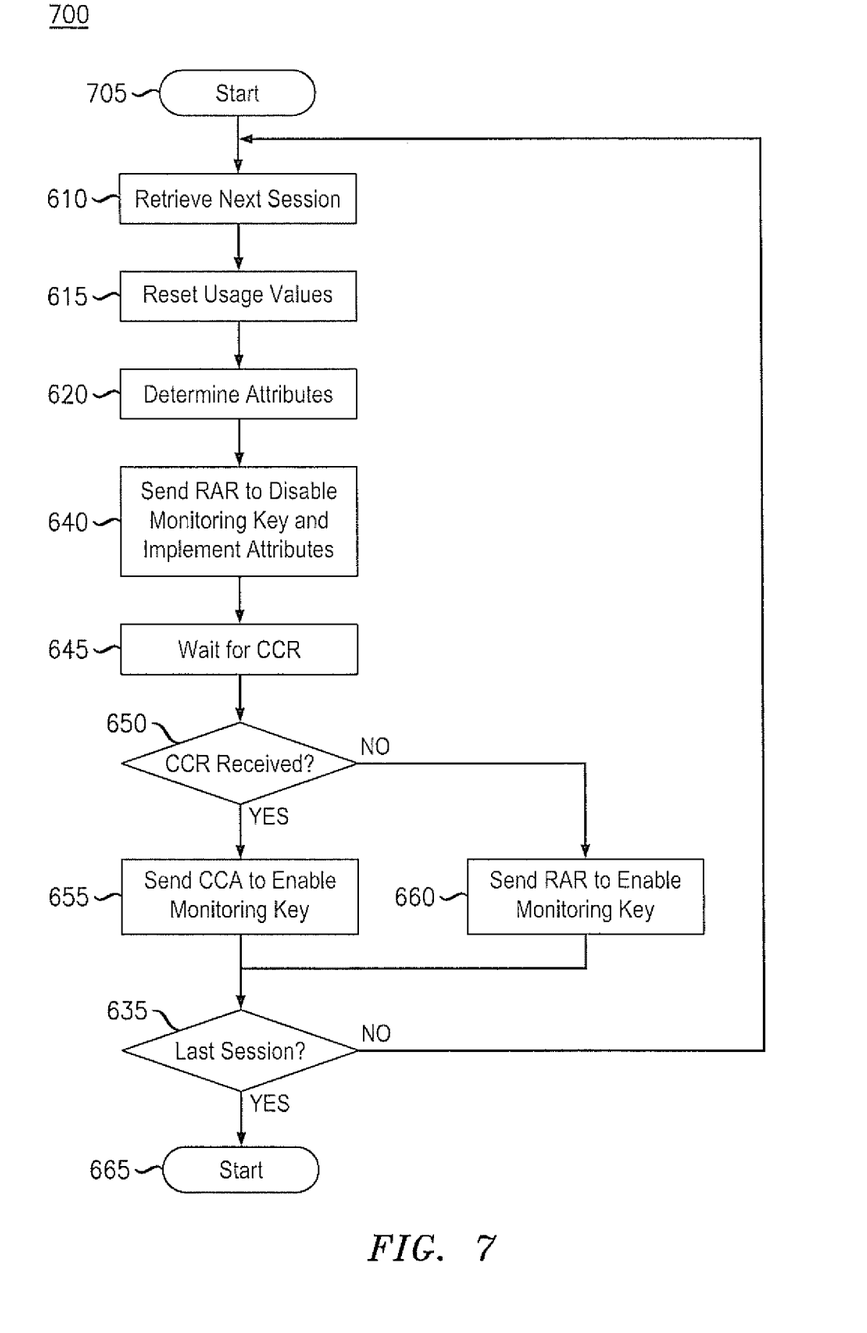
FIG. 7 illustrates an alternative exemplary method performing session rollover.

FIG. 7 illustrates an alternative exemplary method 700 performing session rollover. Method 700 may be performed, for example, by the components of session management node 200 such as subscription record manager 230, message generator 235, threshold calculator 240, and/or rollover initiator 245. Similar to method 600, method 700 may run whenever a session management node 200 determines that a rollover should be performed. For example, method 700 may be performed at the beginning of every month.

Method 700 may include numerous steps that are similar or identical to steps of method 600, as indicated by like reference characters. Unlike method 600, method 700 proceeds directly from step 620 to step 640. Thus, node 200 sends a RAR to disable the monitoring key regardless of whether the monitoring key is currently active. Method 700 then proceed to step 645, where session management node 200 may wait for a period of time to receive a CCR from the usage monitoring node indicating a usage of 0 G. If such a CCR is received, method 700 may proceed to step 655 where the session management node 200 transmits a CCA to the usage monitoring node to enable the monitoring key and implement any restored attributes determined in step 620. If a CCR is not received, however, method 700 may proceed from step 650 to step 660.

It should be noted that while the methods described herein describe the sequential processing of each session, actual implementations may process sessions in parallel. For example, a rollover task may be generated and independently processed for each managed session. Accordingly, various steps wherein the session monitoring node waits for a predetermined period of time may include simply putting the task or process to sleep for a particular time, thus enabling the further processing of other sessions during the "waiting time."

Figure 8:
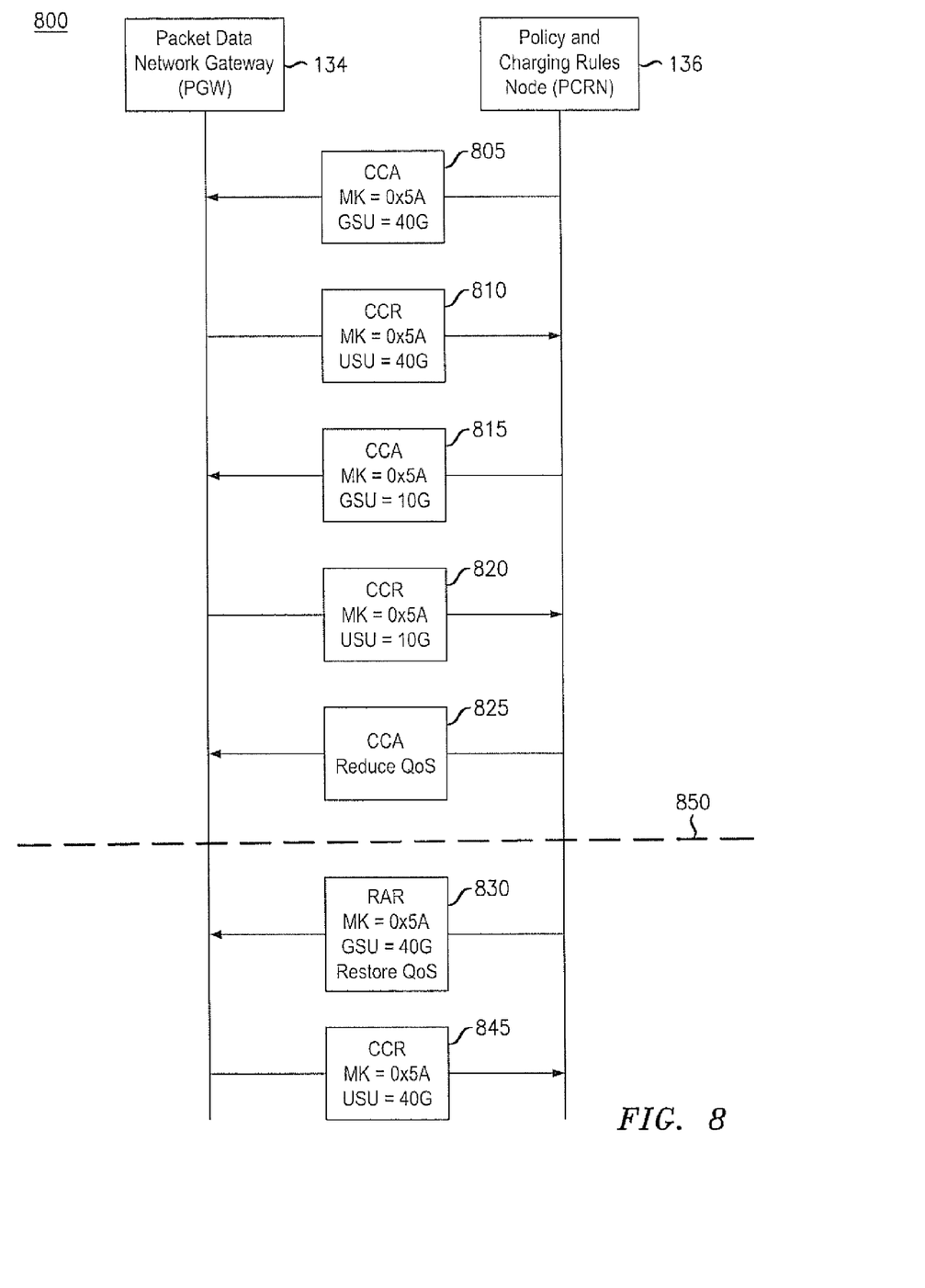
FIG. 8 illustrates an exemplary message exchange for rolling over a session.

FIG. 8 illustrates an exemplary message exchange 800 for rolling over a session. Having described exemplary components and methods for the operation of exemplary subscriber network 100 and session management node 200, an example of the operation of exemplary subscriber network 100 and session management node 200 will now be provided with reference to FIGS. 1-8. For the purposes of this example, session management node 200 may correspond to PCRN 136; data arrangement 300 may indicate the contents of SPR 138; policy set 400 may indicate the contents of policy storage 220; and methods 500, 600 may describe the operation of session management node 200.

As shown by subscription record 330, subscription "0x92D2" has currently used 0% of the 50 G usage limit. The next applicable policy will be policy 415, because usage will reach 80% of the limit before it reaches 100% of the limit. Accordingly, threshold calculator 240 determines that 80% of the 50 G limit is 40 G. Message generator 235 then generates and transmits a CCA (or RAR, if appropriate) 805 indicating that monitoring key "0x5A" should be monitored and that a usage report should be returned once 40 G of transfer has occurred by including this information in a Monitoring-Key AVP and Granted-Service-Unit AVP, respectively. Thereafter, PGW 134 monitors traffic associated with monitoring key "0x5A" until 40 G of transfer has accumulated. At this point, PGW 134 generates and transmits a CCR 810 indicating that the monitoring key "0x5A" has reached the specified 40 G threshold by including this information in a Monitoring-Key AVP and Used-Service-Unit AVP, respectively.

Upon receiving CCR 820, policy engine 215 may retrieve subscription record 330 and update the usage data in steps 520 and 525 of method 500, respectively. Thus, used transfer field 320 of subscription record 330 may now store "40 G," instead of the previous "0 G." In applying the policy in step 530, policy engine may transmit a SMS message to the UE 110 to indicate that 80% of the usage limit has been reached. Next, in step 540, threshold calculator 240 may determine that the next threshold is the 100% threshold of policy 420. Thus, policy 420 will apply once this user reaches 50 G of transfer. Since the user has already used 40 G, only 10 G of transfer remain before the 100% threshold is met. Accordingly, in step 545, message generator 235 generates a CCA 815 indicating that monitoring key "0x5A" should be monitored and that a usage report should be returned once 10 G of transfer has occurred. As before, PGW 134 monitors usage and eventually transmits CCR 820, indicating that an additional 10 G of transfer has occurred.

Again, policy engine 215 updates subscription record 330 to include the newly reported transfer. Thus, used transfer field 320 of subscription record 330 is updated to store a value of "50 G." Policy engine 215 also applies policy 420 by reducing QoS characteristics to 75% of their current value for the session by transmitting a CCA message 825 to PGW 134. Thus, if an AMBR for the session was previously 40 kbps, policy engine 215 will reduce AMBR to 10 kbps. Next, in step 535, threshold calculator 240 determines that all thresholds and policies have been met. Thus, no additional requests for usage monitoring are immediately transmitted to PGW 134. In response, PGW 134 disables monitoring for monitoring key "0x5A."

After the passage of some time, a new month begins at line 850. Thus, PCRN 136, 200 performs method 600 to handle the rollover. At step 615, rollover initiator 245 resets used transfer field 320 of subscription record 330 to a value of "0 G." Further, in step 620, rollover initiator 245 may determine the values to which the QoS should be restored. Continuing with the example of AMBR, rollover initiator may determine that AMBR should be restored to 40 kbps. In step 625, rollover initiator 245 may determine that monitoring key "0x5A" is currently disabled at PGW 134. Thus, in step 630, message generator 235 generates and transmits a RAR 830 instructing the PGW 134 to restore the QoS to the values determined in step 620, enable monitoring for monitoring key "0x5A," and to send a usage report once 40 G of transfer has occurred since the next applicable policy is now policy 415. Operation then continues as previously described. PGW 134 will restore QoS and begin monitoring the session associated with monitoring key "0x5A." Once 40 G of transfer has occurred, PGW 134 will transmit a CCR 845 to indicate that this threshold has been crossed, similar to CCR 810.

According to the foregoing, various exemplary embodiments provide for the avoidance of unpredictable behavior in cooperating nodes. In particular, by taking different action at a session management node after a rollover depending on whether usage monitoring is currently enabled at a usage monitoring node, unpredictable behavior of the usage monitoring node may be avoided. For example, a session management node may avoid transmitting a confusing instruction such as an instruction to disable monitoring when monitoring is already disabled.

It should be apparent from the foregoing description that various exemplary embodiments of the invention may be implemented in hardware and/or firmware. Furthermore, various exemplary embodiments may be implemented as instructions stored on a machine-readable storage medium, which may be read and executed by at least one processor to perform the operations described in detail herein. A machine-readable storage medium may include any mechanism for storing information in a form readable by a machine, such as a personal or laptop computer, a server, or other computing device. Thus, a machine-readable storage medium may include read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be effected while remaining within the spirit and scope of the invention. Accordingly, the foregoing disclosure, description, and figures are for illustrative purposes only and do not in any way limit the invention, which is defined only by the claims.

What is claimed is:

1. A method of performing a rollover by a session management node, the method comprising:
   determining a session to roll over;
   determining whether usage monitoring at a usage monitoring node is currently disabled for the session;
   if usage monitoring at the usage monitoring node is currently disabled for the session, sending a message from the session management node to the usage monitoring node, wherein the message includes an instruction to enable usage monitoring for the session;
   determining at least one attribute to modify for the session; and
   determining a new value for the at least one attribute;
   wherein the message further includes an instruction to apply the new value to the at least one attribute for the session,
   wherein the at least one attribute includes a quality of service (QoS) characteristic comprising one or more of network transport requirements, priority, bandwidth, guaranteed bit rate, aggregate maximum bit rate (AMBR), response time, usage limits for streaming video, usage limits for other communications, and delay.

2. The method of claim 1, wherein the session management node is a Policy and Charging Rules Node (PCRN) and the usage monitoring node is a Packet Data Network Gateway (PGW).

3. The method of claim 1, wherein the step of determining a session to roll over comprises:
   determining that a new billing period has begun; and
   in response to determining that a new billing period has begun, retrieving at least one session managed by the session management node.

4. The method of claim 1, further comprising:
   determining an applicable policy set for the session; and
   determining a usage value to which a policy of the policy set will apply for the session;
   wherein the message further includes an instruction to send a usage report when the session has reached the usage value.

5. The method of claim 1, wherein the step of determining whether usage monitoring at a usage monitoring node is currently disabled for the session comprises:
   determining an applicable policy set for the session, wherein the applicable policy set includes a plurality of thresholds; and
   determining whether all thresholds were met by the session prior to the current rollover.

6. The method of claim 1, further comprising:
   if usage monitoring at the usage monitoring node is not currently disabled for the session, sending a message from the session management node to the usage monitoring node, wherein the message includes an instruction to disable usage monitoring for the session.

7. The method of claim 1, further comprising:
   waiting for a length of time to receive a usage report at the session management node from the usage monitoring node;
   wherein the step of sending a message from the session management node to the usage monitoring node is only performed when a usage report is not received during the length of time.

8. A session management node for performing a rollover, the session management node comprising:
   an interface that communicates with a usage monitoring node;
   a session storage that stores a plurality of session records;

a rollover initiator that:
  determines that a rollover should be performed,
  in response to determining that a rollover should be performed, retrieves a session record, and
  determines whether usage monitoring at the usage monitoring node is currently disabled for a session associated with the session record; and
a message generator that, if usage monitoring at the usage monitoring node is currently disabled for a session associated with the session record, generates a message instructing the usage monitoring node to enable usage monitoring at the usage monitoring node for a session associated with the session record; determines at least one attribute to modify for the session; and determines a new value for the at least one attribute;
  wherein the message further includes an instruction to apply the new value to the at least one attribute for the session,
wherein the at least one attribute is a quality of service (QoS) characteristic comprising one or more of network transport requirements, priority, bandwidth, guaranteed bit rate, aggregate maximum bit rate (AMBR), response time, usage limits for streaming video, usage limits for other communications, and delay.

9. The session management node of claim 8, wherein the rollover initiator further:
  waits for a length of time for the session management node to receive a usage report from the usage monitoring node;
  wherein the message generator generates the message instructing the usage monitoring node to enable usage monitoring at the usage monitoring node for a session associated with the session record only when the session management node does not receive a usage report during the length of time.

10. The session management node of claim 8, further comprising a threshold calculator that:
  determines an applicable policy set for the session; and
  determines a usage value to which a policy of the policy set will apply for the session;
  wherein the message further includes an instruction to send a usage report when the session has reached the usage value.

11. The session management node of claim 8, wherein, in determining whether usage monitoring at the usage monitoring node is currently disabled for a session associated with the session record, the rollover initiator:
  determines an applicable policy set for the session, wherein the applicable policy set includes a plurality of thresholds; and
  determines whether all thresholds were met by the session prior to the current rollover.

12. A non-transitory machine-readable storage medium encoded with instructions for performing a rollover by a session management node, the machine readable storage medium comprising:
  instructions for determining a session to roll over;
  instructions for determining whether usage monitoring at a usage monitoring node is currently disabled for the session;
  instructions for if usage monitoring at the usage monitoring node is currently disabled for the session, sending a message from the session management node to the usage monitoring node, wherein the message includes an instruction to enable usage monitoring for the session;
  instructions for determining at least one attribute to modify for the session; and
  instructions for determining a new value for the at least one attribute;
  wherein the message further includes an instruction to apply the new value to the at least one attribute for the session,
  wherein the at least one attribute is a quality of service (QoS) characteristic comprising one or more of network transport requirements, priority, bandwidth, guaranteed bit rate, aggregate maximum bit rate (AMBR), response time, usage limits for streaming video, usage limits for other communications, and delay.

13. The non-transitory machine-readable storage medium of claim 12, further comprising:
  instructions for waiting for a length of time to receive a usage report at the session management node from the usage monitoring node;
  wherein the instructions for sending a message from the session management node to the usage monitoring node are only performed when a usage report is not received during the length of time.

14. The non-transitory machine-readable storage medium of claim 12, further comprising:
  instructions for determining an applicable policy set for the session; and
  instructions for determining a usage value to which a policy of the policy set will apply for the session;
  wherein the message further includes an instruction to send a usage report when the session has reached the usage value.

15. The non-transitory machine-readable storage medium of claim 12, wherein the instructions for determining whether usage monitoring at a usage monitoring node is currently disabled for the session comprises:
  instructions for determining an applicable policy set for the session, wherein the applicable policy set includes a plurality of thresholds; and
  instructions for determining whether all thresholds were met by the session prior to the current rollover.

16. A method of performing a rollover by a session management node, the method comprising:
  determining a session to roll over;
  sending a first request message from the session management node to the usage monitoring node, wherein the message includes an instruction to disable usage monitoring for the session;
  waiting for a period of time to receive a second request message from the usage monitoring node;
  if the session management node receives the second request message from the usage monitoring node, sending an answer message to the usage monitoring node, wherein the answer message includes an instruction to enable usage monitoring for the session;
  determining at least one attribute to modify for the session; and
  determining a new value for the at least one attribute;
  wherein the message further includes an instruction to apply the new value to the at least one attribute for the session,
  wherein the at least one attribute includes a quality of service (QoS) characteristic comprising one or more of network transport requirements, priority, bandwidth, guaranteed bit rate, aggregate maximum bit rate (AMBR), response time, usage limits for streaming video, usage limits for other communications, and delay; and
  if the session management node does not receive the second request message from the usage monitoring node, sending a third request message to the usage monitoring node, wherein the third request message includes an instruction to enable usage monitoring for the session.

* * * * *